US012669999B2

(12) United States Patent
Sayyed et al.

(10) Patent No.: US 12,669,999 B2
(45) Date of Patent: Jun. 30, 2026

(54) BIOS NETWORK SAFE ASSURANCE METHOD

(71) Applicant: Dell Products L.P., Round Rock, TX (US)

(72) Inventors: Ibrahim Sayyed, Georgetown, TX (US); Venkata Rama Krishna Rao Atta, Hyderabad (IN); Richard M. Tonry, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/473,100

(22) Filed: Sep. 22, 2023

(65) Prior Publication Data
US 2025/0103348 A1 Mar. 27, 2025

(51) Int. Cl.
*G06F 9/4401* (2018.01)

(52) U.S. Cl.
CPC .................................. *G06F 9/4416* (2013.01)

(58) Field of Classification Search
None
See application file for complete search history.

(56) References Cited

U.S. PATENT DOCUMENTS

| | | | | |
|---|---|---|---|---|
| 11,323,879 B2 * | 5/2022 | Lagnado | ................. | G06F 21/44 |
| 2007/0147318 A1 * | 6/2007 | Ross | .................... | H04W 48/16 |
| | | | | 370/338 |
| 2021/0243594 A1 * | 8/2021 | Suryanarayana | ... | H04W 12/033 |
| 2021/0359854 A1 * | 11/2021 | Braduke | ................. | G06F 21/78 |
| 2022/0043915 A1 * | 2/2022 | Bramley | .............. | G06F 21/575 |
| 2022/0104017 A1 * | 3/2022 | Konda | ................ | H04W 12/086 |

* cited by examiner

*Primary Examiner* — Fahmida Rahman
(74) *Attorney, Agent, or Firm* — Jackson Walker L.L.P.

(57) ABSTRACT
An information handling system may include at least one processor; and a wireless network interface adapter; wherein the information handling system is configured to: store credentials for a wireless network in a secure storage vault accessible from a pre-boot environment; and during execution of the pre-boot environment, connect the wireless network interface adapter to the wireless network based on the credentials without requiring user input of the credentials.

15 Claims, 4 Drawing Sheets

BIOS NETWORK SAFE ASSURANCE METHOD

TECHNICAL FIELD

The present disclosure relates in general to information handling systems, and more particularly to connecting to a Wi-Fi network from within a pre-boot environment such as a Unified Extensible Firmware Interface (UEFI) Basic Input/Output System (BIOS) environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It may be desirable in some instances to allow an information handling system to access a network such as a Wi-Fi network from within a pre-boot environment. For example, a manufacturer of information handling systems may use various pre-boot serviceability solutions, such as service operating system (SOS) recovery, firmware over the air (FOTA), and HTTP boot, using a BIOSConnect framework. These solutions may use Wi-Fi to connect with a cloud system and download serviceability/boot images. However, users are currently required to manually scan for access points, select the desired Wi-Fi network, and enter the Wi-Fi password every time they connect in the pre-boot environment. That is, the pre-boot environment lacks the ability to save credentials for Wi-Fi networks, and it also lacks other features available during operating system runtime such as auto-connect and network auto-switching. This is due at least in part to technical and/or security limitations relating to storing Wi-Fi passwords in the pre-boot environment. This is inconvenient, and it may cause difficulty each time the pre-boot network services are needed.

For example, users currently need to enter the Wi-Fi password every time they connect, even when connecting repeatedly to the same home Wi-Fi router. In most cases, home Wi-Fi network setup is done by a knowledgeable person who sets up all the devices. Most of the devices save the Wi-Fi profile (including the SSID and password), and the operating system on the devices provides security controls to protect the Wi-Fi profiles. Existing pre-boot Wi-Fi solutions lack this feature due to inadequate security measures. In particular, the BIOS-managed NVRAM space can be accessed by various means if the system is in the physical possession of an unauthorized users, and so due to this security weakness, pre-boot Wi-Fi features do not offer the option to store passwords.

Further, it may not be possible in existing solutions to switch to a different or better Wi-Fi home network when a file download is interrupted on an existing home Wi-Fi network. BIOSConnect, which is responsible for downloading the recovery solution set, takes an average of 15 minutes to complete this task. However, the download process can be stalled due to external factors such as an internet service provider's (ISP's) fair network usage policies, network congestion, etc. When BIOSConnect detects a stalled download process, it may abort the recovery process by deleting the content already downloaded. As a result, users must initiate a new connection by connecting to another Wi-Fi network. These interrupted downloads waste users' time and money, particularly when they have metered internet services provided by their ISP.

Further, existing pre-boot Wi-Fi features are generally not able to connect to enterprise Wi-Fi networks. Enterprises typically comply with one of the 802.1x standards to ensure secure network connections, which involve certificate-based user and device authentication to join an enterprise network. These certificates and the corporate Wi-Fi network name are securely saved in the OS environment. However, due to a lack of secure mechanisms and update policies in the UEFI pre-boot environment, existing solutions do not support enterprise Wi-Fi connections.

For purposes of this disclosure, the term enterprise Wi-Fi should be understood to refer to Wi-Fi networks using 802.1x authentication. The term home Wi-Fi should be understood to refer to any other Wi-Fi networks (e.g., networks using no encryption, WEP, WPA, etc.).

Embodiments of this disclosure thus provide improvements in the field of pre-boot Wi-Fi connection management.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with pre-boot Wi-Fi network connections may be reduced or eliminated.

In accordance with embodiments of the present disclosure, an information handling system may include at least one processor; and a wireless network interface adapter; wherein the information handling system is configured to: store credentials for a wireless network in a secure storage vault accessible from a pre-boot environment; and during execution of the pre-boot environment, connect the wireless network interface adapter to the wireless network based on the credentials without requiring user input of the credentials.

In accordance with these and other embodiments of the present disclosure, a method may include an information handling system storing credentials for a wireless network in a secure storage vault that is accessible from a pre-boot environment; and during execution of the pre-boot environment, the information handling system connecting a wireless network interface adapter thereof to the wireless network based on the credentials without requiring user input of the credentials.

In accordance with these and other embodiments of the present disclosure, an article of manufacture may include a non-transitory, computer-readable medium having computer-executable code thereon that is executable by a processor of an information handling system for: storing credentials for a wireless network in a secure storage vault that is accessible from a pre-boot environment; and during execution of the pre-boot environment, connecting a wireless network interface adapter of the information handling system to the wireless network based on the credentials without requiring user input of the credentials.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
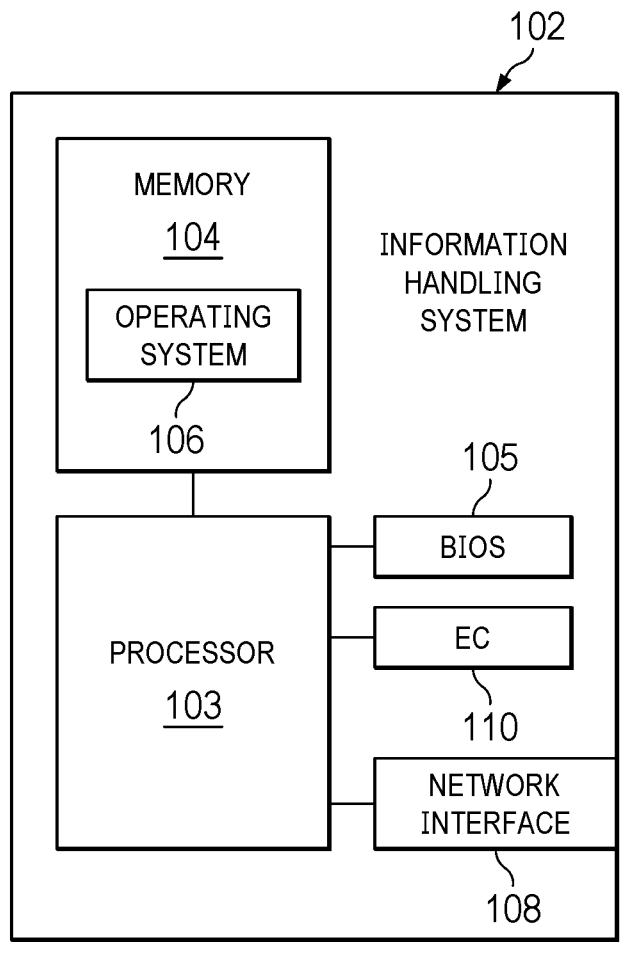
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may also include an embedded controller (EC) 110. EC 110 may be implemented with a microcontroller in some cases, and it may be configured to carry out various low-level system tasks for information handling system 102.

As discussed above, embodiments of this disclosure may improve the ability of a network interface such as network interface 108 to couple to a Wi-Fi network while information handling system 102 is executing a pre-boot environment such as a UEFI BIOS environment. In order to offer seamless auto-connect/network switching experience, embodiments allow for BIOS 105 and/or EC 110 to use an access-controlled secure vault where network profiles can be saved and retrieved during pre-boot runtime.

Embodiments may create an OEM-specific secure vault for storing Wi-Fi profiles (e.g., both home/consumer profiles and enterprise profiles). This vault may be accessible via the BIOS or the EC with access policies that may be determined by an administrator. For example, the Wi-Fi profiles stored in the vault may be provisioned by a user in the case of home networks and by an administrator in the case of enterprise networks.

These profiles may also be securely accessed by OEM-specific Wi-Fi features (e.g., BIOSConnect or the like) based on the device's boot state and boot session to connect to either a home Wi-Fi network or an enterprise network depending on the device location. When the profiles are in use, the profile data may be placed in privileged-access memory (e.g., via system management mode (SMM) or similar functionality) and handle the Wi-Fi connection process directly from the secure memory region without disclosing the details of the profile (e.g., the Wi-Fi credentials or certificate) to other non-privileged pre-boot modules or drivers. Thus the sensitive Wi-Fi profiles may not be compromised.

For example, access policies for Wi-Fi profiles stored in the vault may include rules such as the following:

1. Declaring a profile as a stale profile and deleting it, if the profile is not used within a in pre-defined time.
2. Invalidating the profile if the system security level is lowered. This may be necessary if the security level of the system has been compromised or if there is a risk of unauthorized access or data breach. Invalidating a profile effectively removes its validity and renders it unusable.
3. Adding extra control such as special Wi-Fi profile password validation to access the enterprise Wi-Fi profiles. This password may be the same as a log-on password and can provide extra security on the enterprise premises.
4. Rules to invalidate the profile on repeated unsuccessful profile access attempts.
5. Rules to invalidate the profile if there is a configuration drift on the profile.

Administrators may also be able to update the Wi-Fi access policies as needed (e.g., by using a software agent executing within the OS). Further, build-time access control lists (ACLs) may be configured in the EC so that only selected pre-authorized BIOS modules can access the secure vault.

Some embodiments may also provide a solution for allowing the pre-boot environment to securely connect to a network by reusing the host OS shared network credentials. Embodiments allow for dynamic auto-switching and auto-connecting to Wi-Fi networks without interrupting in-transit network file downloads by adapting to a change in network conditions. A one-time password (OTP) policy may also be used to protect enterprise Wi-Fi profile access, as discussed in more detail below.

Embodiments thus may provide enterprise Wi-Fi profile management by the BIOS in a pre-boot environment, an EC-based security API for enterprise Wi-Fi credential management and provisioning, OS-independent OTP-based access to authorize extraction of Wi-Fi credentials from the EC-based credential vault. Further, once Wi-Fi is connected during pre-boot, a Wi-Fi supplicant agent may reach out to the network to re-authorize the next OTP for the next boot/session.

Figure 2:
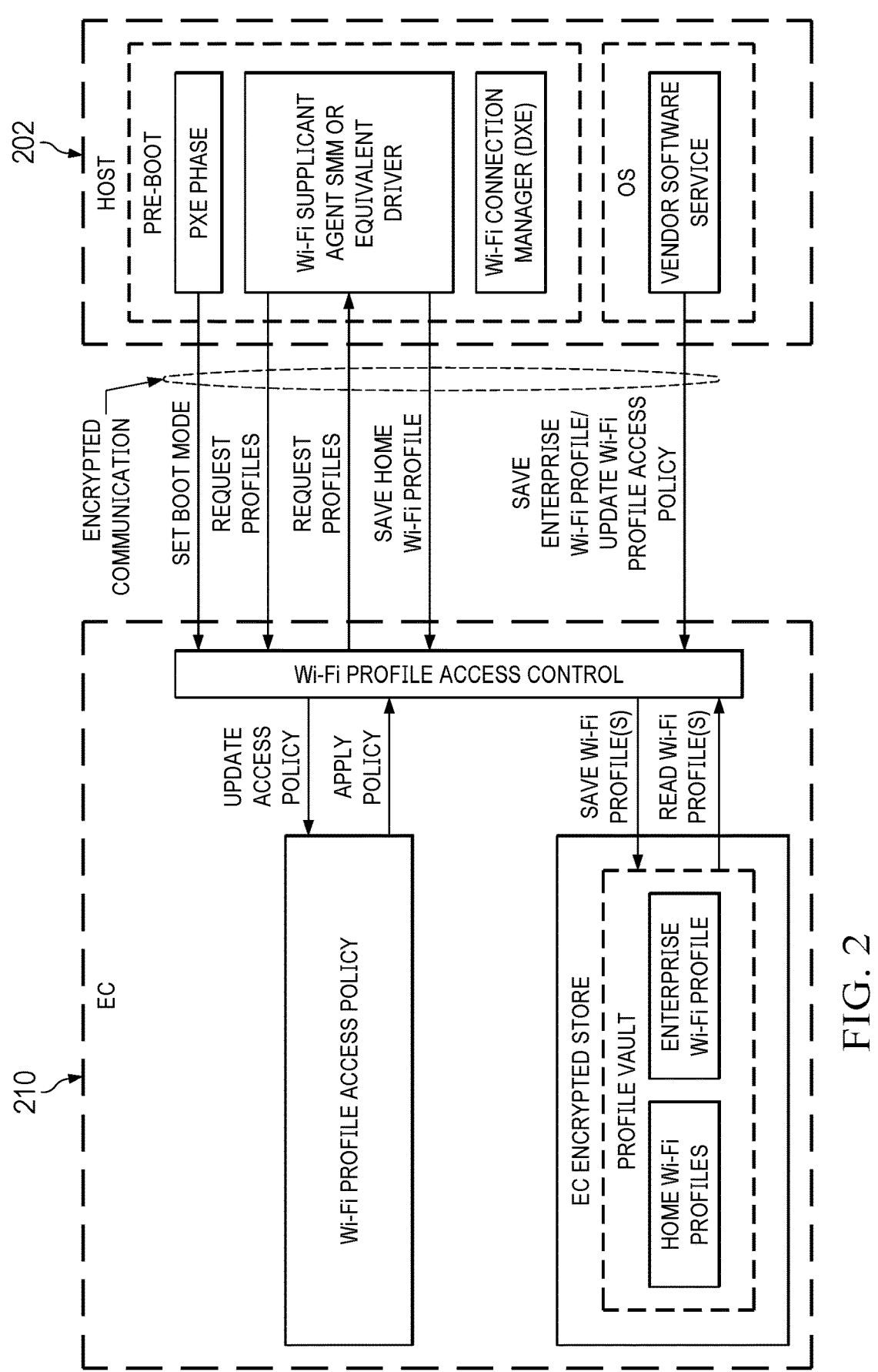
FIG. 2 illustrates a block diagram of an example architecture for managing Wi-Fi connections in a pre-boot environment, in accordance with embodiments of the present disclosure.

FIG. 2 illustrates a high-level architecture diagram, according to some embodiments. As shown, during the PXE boot phase, the boot mode may be set to a special Wi-Fi boot mode. For example, a user may select such an option, or host 202 may initiate a BIOSConnect session to recover from a failure. In response to the selection of this boot mode, EC 210 may begin the process for unlocking the Wi-Fi profile vault. If this boot mode is not selected, the vault may remain locked for the remainder of the boot process.

A Wi-Fi supplicant agent executing in the pre-boot environment may transmit a request to the EC for a Wi-Fi profile. All communications between host 202 and EC 210 may be encrypted using existing secure communication channels. The EC may verify the request against its access policies, retrieve the profile from the profile vault within its encrypted store, and send the profile to the host.

Additionally, the host may be able to save changes to the profiles in the EC's profile vault in some embodiments. For example, an administrator may use a software service from within the OS to save enterprise Wi-Fi profiles. In some embodiments, a user may also be able to save home Wi-Fi profiles.

Figure 3:
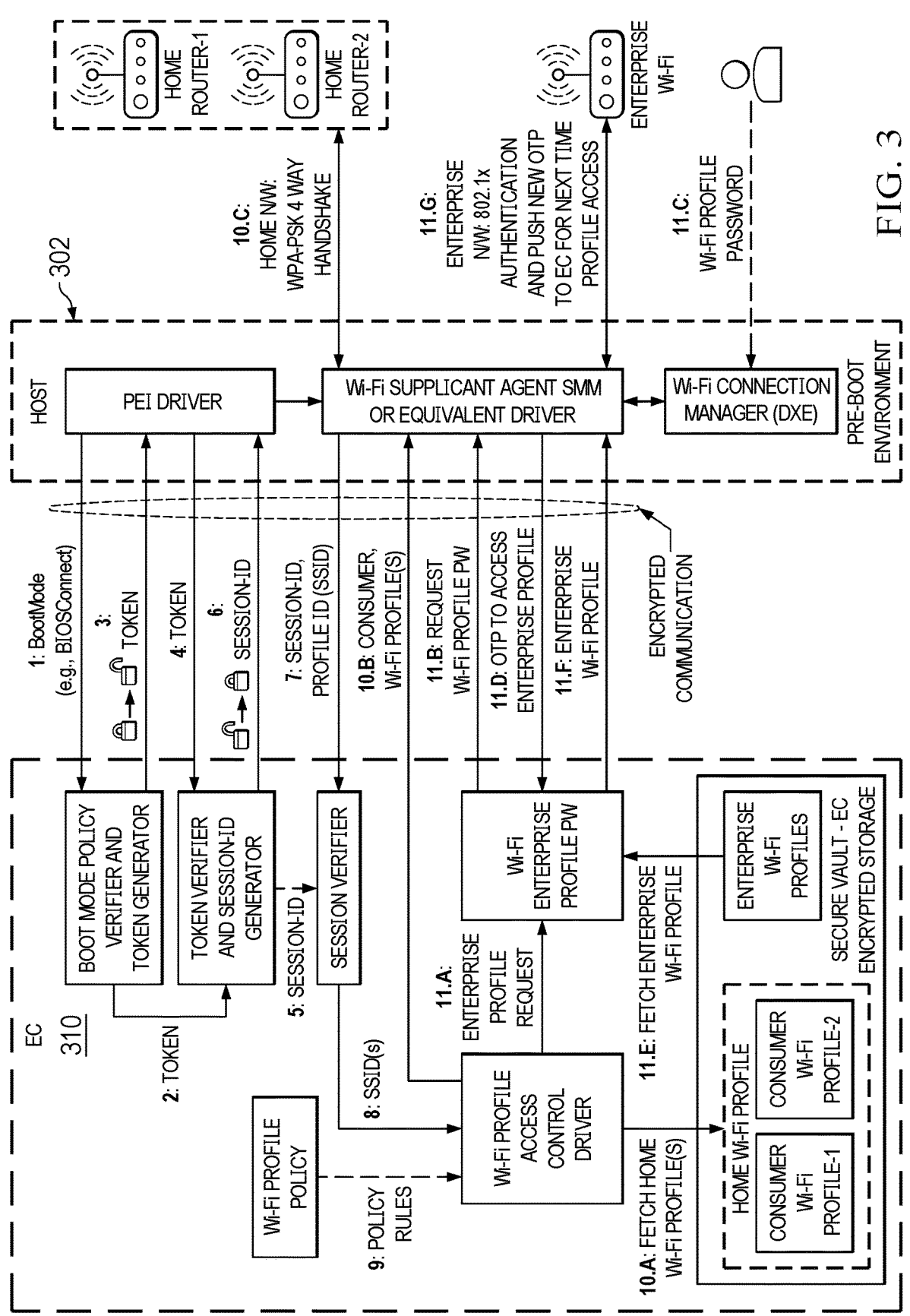
FIG. 3 illustrates a block diagram of an example architecture for managing home Wi-Fi connections in a pre-boot environment, in accordance with embodiments of the present disclosure.

FIG. 3 illustrates an architecture diagram relating to retrieving stored profiles, according to some embodiments. As discussed with regard to FIG. 2, host 302 may set a boot mode, and a driver in the PEI phase may communicate with EC 310. At steps 2-6, a token may be generated, and a session ID may be used by the EC's session verifier to confirm access to the secure vault.

At step 7, the host pre-boot Wi-Fi supplicant agent transmits the session ID to the session verifier within EC 310, along with the SSID of the Wi-Fi network. At step 8, if the session ID is correct, then the session verifier transmits the SSID to the Wi-Fi profile access control driver. At step 9, the Wi-Fi profile access control driver checks the policy rules to confirm that access should be granted.

Steps 10.A and 10.B illustrate the process for allowing access to a home Wi-Fi network, while steps 11.A through 11.G illustrate the process for allowing access to an enterprise Wi-Fi network. In particular, in the case of a home network, the Wi-Fi profile access control driver fetches the home Wi-Fi profile with the access credentials from the secure vault. At step 10.B, it returns the profile to the host pre-boot Wi-Fi supplicant agent, which then performs the Wi-Fi handshake at step 10.C and connects to the home network access point.

In the case of an enterprise network, at step 11.A, the Wi-Fi profile access control driver passes an enterprise profile request to the Wi-Fi enterprise profile password manager. At step 11.B, a request is sent to the host pre-boot Wi-Fi supplicant agent, and at step 11.C, the user enters a password (e.g., an enterprise logon password) to grant access via the front-end Wi-Fi connection manager.

At step 11.D and 11.E, a one-time password is used to access the enterprise Wi-Fi profile from the secure vault. At step 11.F, the profile is returned to the host pre-boot Wi-Fi supplicant agent, which then performs the 802.1x authentication at step 11.G and connects to the enterprise network access point. Additionally, a new one-time password may be pushed to the EC for use during a subsequent connection.

Figure 4:
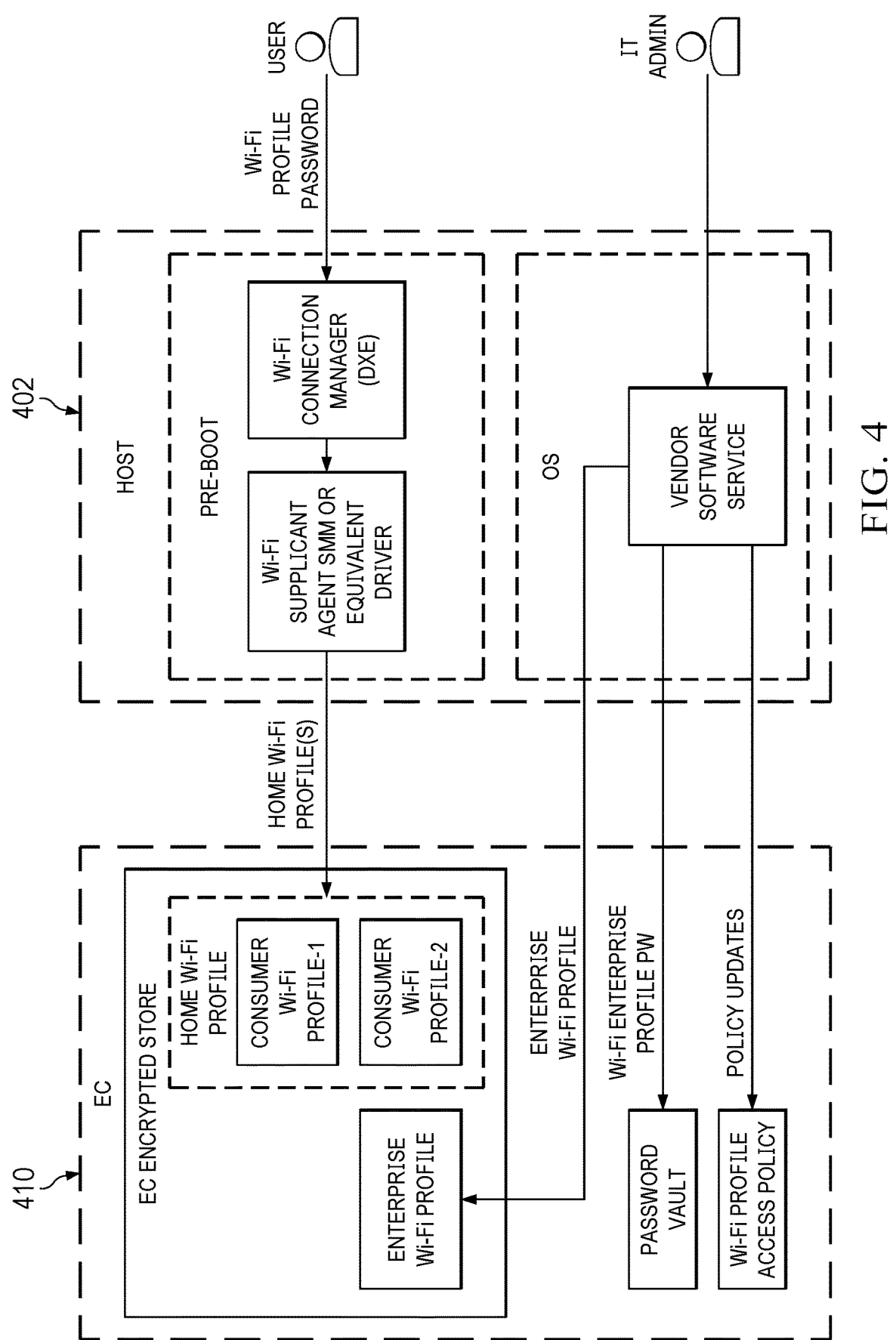
FIG. 4 illustrates a block diagram of an example architecture for managing enterprise Wi-Fi connections in a pre-boot environment, in accordance with embodiments of the present disclosure.

FIG. 4 illustrates an architecture diagram relating to storing new profiles in the EC secure vault, according to some embodiments. As shown, a user may interact with a pre-boot Wi-Fi connection manager on host 402 in order to store home Wi-Fi credentials in the encrypted store on EC 410. Further, an administrator may interact with a software service to update access policies and/or store credentials for connecting to an enterprise Wi-Fi network.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor;

a secure storage vault; and a wireless network interface adapter;

wherein the information handling system is configured to:

store credentials for a wireless network in the secure storage vault, the secure storage vault being accessible from a pre-boot environment, in the information handling system wherein the wireless network is an enterprise Wi-Fi network, and wherein the credentials include an 802.1x certificate associated with the enterprise Wi-Fi network; and during execution of the pre-boot environment, connect the wireless network interface adapter to the wireless network based on the credentials without requiring user input of the credentials;

wherein the pre-boot environment includes a plurality of modules, and wherein the secure storage vault is accessible only to a pre-authorized subset of the plurality of modules.

2. The information handling system of claim 1, wherein the secure storage vault is an encrypted data store of an embedded controller (EC) of the information handling system.

3. The information handling system of claim 1, wherein the pre-boot environment is a Unified Extensible Firmware Interface (UEFI) Basic Input/Output System (BIOS).

4. The information handling system of claim 1, wherein the information handling system is further configured to execute a software agent during execution of an operating system, wherein the software agent is configured to update the secure storage vault with new credentials.

5. The information handling system of claim 1, wherein the secure storage vault is further configured to store credentials for a home Wi-Fi network, the credentials for the home Wi-Fi network comprising a service set identifier (SSID) and password associated with the home Wi-Fi network.

6. A method comprising:

an information handling system storing credentials for a wireless network in a secure storage vault of the information handling system, the secure storage vault being accessible from a pre-boot environment, in the information handling system wherein the wireless network is an enterprise Wi-Fi network, and wherein the credentials include an 802.1x certificate associated with the enterprise Wi-Fi network; and during execution of the pre-boot environment, the information handling system connecting a wireless network interface adapter thereof to the wireless network based on the credentials without requiring user input of the credentials;

wherein the pre-boot environment includes a plurality of modules, and wherein the secure storage vault is accessible only to a pre-authorized subset of the plurality of modules.

7. The method of claim 6, further comprising the information handling system executing a software agent during execution of an operating system, wherein the software agent is configured to update the secure storage vault with new credentials.

8. The method of claim 6, wherein the secure storage vault is an encrypted data store of an embedded controller (EC) of the information handling system.

9. The method of claim 6, wherein the pre-boot environment is a Unified Extensible Firmware Interface (UEFI) Basic Input/Output System (BIOS).

10. The method of claim 6, wherein the secure storage vault is further configured to store credentials for a home Wi-Fi network, the credentials for the home Wi-Fi network comprising a service set identifier (SSID) and password associated with the home Wi-Fi network.

11. An article of manufacture comprising a non-transitory, computer-readable medium having computer-executable code thereon that is executable by a processor of an information handling system for:

storing credentials for a wireless network in a secure storage vault of the information handling system, the secure storage vault being accessible from a pre-boot environment, in the information handling system wherein the wireless network is an enterprise Wi-Fi network, and wherein the credentials include an 802.1x certificate associated with the enterprise Wi-Fi network; and during execution of the pre-boot environment, connecting a wireless network interface adapter of the information handling system to the wireless network based on the credentials without requiring user input of the credentials;

wherein the pre-boot environment includes a plurality of modules, and wherein the secure storage vault is accessible only to a pre-authorized subset of the plurality of modules.

12. The article of claim 11, wherein the secure storage vault is further configured to store credentials for a home Wi-Fi network, the credentials for the home Wi-Fi network comprising a service set identifier (SSID) and password associated with the home Wi-Fi network.

13. The article of claim 11, wherein the computer-executable code is further executable for executing a software agent during execution of an operating system, wherein the software agent is configured to update the secure storage vault with new credentials.

14. The article of claim 11, wherein the secure storage vault is an encrypted data store of an embedded controller (EC) of the information handling system.

15. The article of claim 11, wherein the pre-boot environment is a Unified Extensible Firmware Interface (UEFI) Basic Input/Output System (BIOS).

* * * * *